United States Patent
Feuser et al.

(10) Patent No.: US 6,801,956 B2
(45) Date of Patent: Oct. 5, 2004

(54) ARRANGEMENT WITH A MICROPROCESSOR

(75) Inventors: Markus Feuser, Hamburg (DE); Kurt Koenig, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 171 days.

(21) Appl. No.: 10/014,862

(22) Filed: Nov. 13, 2001

(65) Prior Publication Data

US 2002/0103944 A1 Aug. 1, 2002

(30) Foreign Application Priority Data

Nov. 15, 2000  (DE) .......................................... 100 56 592

(51) Int. Cl.⁷ .............................................. G06F 3/00
(52) U.S. Cl. ........................ 710/14; 710/313; 235/492
(58) Field of Search ................................ 235/375, 451, 235/492; 713/500; 710/2, 10–14, 19, 100, 104, 301, 313, 316

(56) References Cited

U.S. PATENT DOCUMENTS

| | | | | | |
|---|---|---|---|---|---|
| 6,151,647 | A | * | 11/2000 | Sarat ........................... | 710/301 |
| 6,343,364 | B1 | * | 1/2002 | Leydier et al. ............. | 713/500 |
| 6,439,464 | B1 | * | 8/2002 | Fruhauf et al. ............. | 235/492 |
| 6,543,690 | B2 | * | 4/2003 | Leydier et al. ............. | 235/451 |
| 6,557,754 | B2 | * | 5/2003 | Gray et al. .................. | 235/375 |
| 6,581,122 | B1 | * | 6/2003 | Sarat ........................... | 710/301 |

* cited by examiner

Primary Examiner—Christopher B. Shin
(74) Attorney, Agent, or Firm—Kevin Simons

(57) ABSTRACT

An arrangement with a microprocessor, particularly a microprocessor for use in a chip card is described. The arrangement includes a microprocessor which is connected to at least a USB interfaces and an ISO interface for exchanging data signals. A selection unit within the microprocessor may be configured to select between the USB and ISO interfaces, and a switching unit within the microprocessor may be configured to subsequently switch between the USB and ISO interfaces by initiating an internal reset of the microprocessor.

Figure 1:
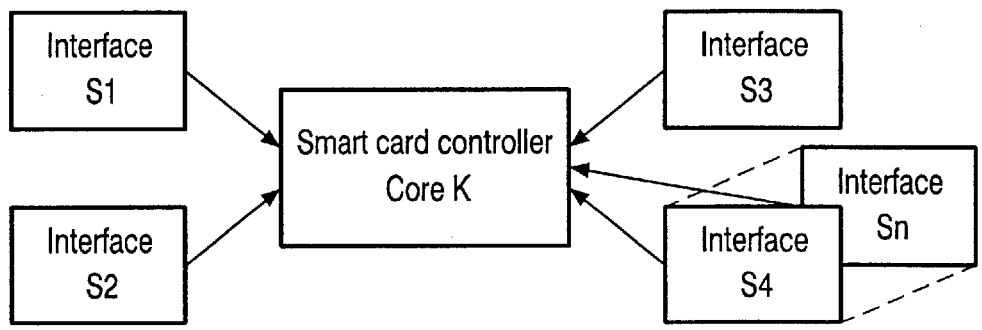

8 Claims, 1 Drawing Sheet

ARRANGEMENT WITH A MICROPROCESSOR

FIELD OF THE INVENTION

The invention relates to an arrangement with a microprocessor. The invention particularly relates to an arrangement with a microprocessor for use in a chip card. Such a microprocessor will hereinafter be referred to as smart card controller.

SUMMARY

In addition to interface standards laid down in the ISO7816 and ISO14443 standards, the interface standard denoted as "USB" (Universal Serial Bus) has gained increasing significance in telecommunication equipment.

It is an object of the invention to utilize a USB interface also for microprocessors, particularly for smart card controllers. It is a particular object of the invention to operate a smart card controller having more than one interface.

This object is solved by an arrangement with a microprocessor which is connected to at least two interfaces for exchanging data signals, wherein at least one of these interfaces is a USB interface.

The microprocessor is preferably formed for use in a chip card.

Advantageously, the arrangement according to the invention comprises a device for automatically switching or selecting the interfaces.

The microprocessor and/or arrangement for automatically switching or selecting the interfaces is particularly formed for use in optionally a USB interface and/or an interface in accordance with ISO14443 and/or an interface in accordance with ISO7816.

These and other aspects of the invention are apparent from and will be elucidated with reference to the embodiments described hereinafter.

BRIEF DESCRIPTION OP THE DRAWINGS

Figure 2:
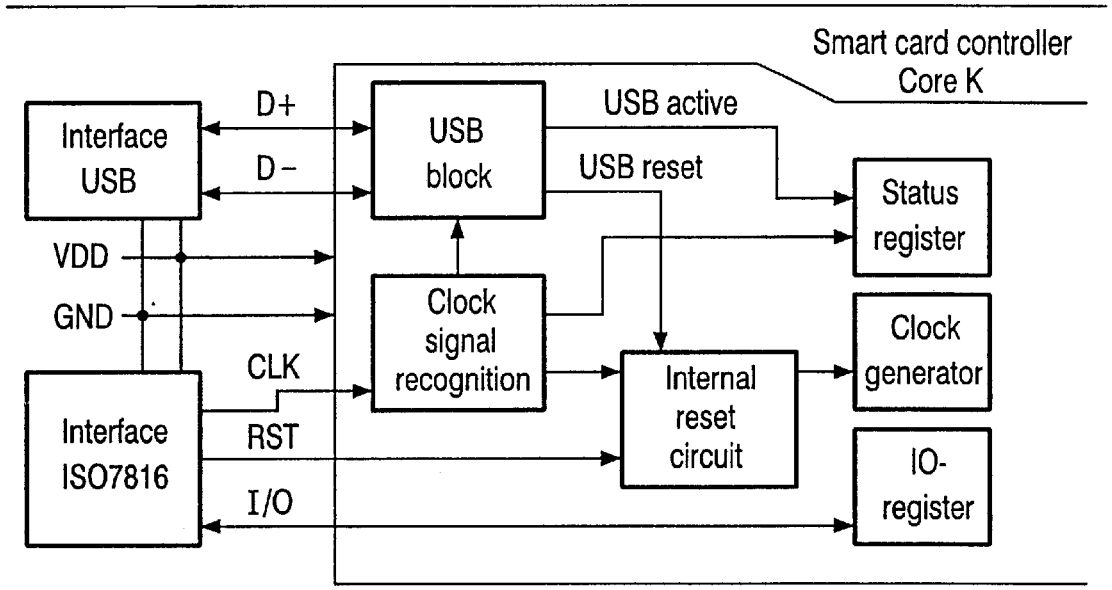

In the drawings:

FIG. 1 shows an arrangement of a smart card controller with a plurality of interfaces, FIG. 2 shows a smart card controller with a USB interface and an ISO7816 interface.

DETAILED DESCRIPTION

The embodiments show how an electronic circuit, particularly a smart card controller can be built up in order that optionally one or more available interfaces are utilized for exchanging data. Possible interfaces may be both wireless and contacted communication channels, particularly the interfaces in accordance with the ISO/IEC14443 standard (contactless), ISO/IEC7816 (contacted) and USB.

FIG. 1 shows an arrangement consisting of a smart card controller core K and a series of interfaces S1, S2 and possibly S3, S4, etc. In the arrangement described by way of example, the core K comprises a CPU (processor), at least a RAM and a ROM memory, one or more co-processors, a control logic and a non-volatile memory, for example, an EEPROM and/or a flash memory. The interfaces S1, S2, . . . are arranged outside the core K. One or more of these interfaces S1, S2, . . . are formed as USB interfaces and at least one of the interfaces S1, S2, . . . is formed as an interface in accordance with ISO7816.

An ISO7816 interface which is specially formed for smart card controllers, provides the following signals and lines:

a clock signal on a line "CLK",
a reset signal on a line "RST",
a data signal on a line "I/O" (input/output),
a power supply voltage on a line "VDD" and
ground on a line "GND".

The operation is started by a rest pulse on the line RST. The clock is applied via the line CLK. The power supply is ensured via VDD. It is similarly simple to operate a smart card controller via this interface.

Other interfaces require additional measures so as to be able to operate a smart card controller. By way of example of the USB interface, an arrangement is described hereinafter, allowing the operation of a smart card controller. Additionally, the operation may be performed via an ISO7816 interface. FIG. 2 shows the arrangement in greater detail. For combining the single voltages or signals and the lines conveying these signals to an optional or simultaneous operation of both interfaces connected to the core K, the following aspects apply.

Power supply: both USB and ISO7816 interfaces convey power supply signals VDD and GND, so that they can be jointly utilized.

Clock signal: if the ISO7816 interface is used, a clock signal is on the line CLK where the clock signal recognition checks whether this signal oscillates in a given predetermined frequency range. If it does not, the whole smart card controller is reset via the internal reset circuit. Subsequently, an internal clock signal is used. This renders the USB operation possible but does not automatically activate it.

When the USB interface is used, a high-precision clock signal can be applied to CLK. However, when the input CLK is not connected, the circuit is reset, as above, and an internal clock signal is made available.

Reset signal: when the ISO7816 interface is used, a signal for resetting the smart card controller is made available on line RST. Since the smart card controller includes an internal reset circuit, the full function is also given when such an RST signal is not connected, but when a pure USB operation is desired instead.

On the other hand, a reset may be triggered via the USB interface, namely via the internal line "USB reset". This signal is derived from the two USB interface signals D+ and D−. "USB reset" is supplied to the internal reset circuit in which an OR combination from "USB reset", RST signal of the ISO7816 interface and further internal reset signals is realized. Optionally, it may be predetermined whether "USB reset" will also become active when a second output signal "USB active" of an USB block within the core K is not set.

There are four reset sources:
RST
USB reset
the internal reset signal which is activated at each switching operation, i.e. whenever the smart card controller is put into operation, and
the reset signal which is formed by the clock signal recognition, if no signal oscillating in the nominal frequency band is present on the line CLK.

Data signal: each interface has its own data lines: these are denoted by "I/O" for the ISO7816 interface, and by "D+" and "D−" for the USB standard interface. Conflicts are therefore excluded.

The core K further comprises a status register. Via the status register, the core K of the smart card controller may query whether the USB interface is connected. This is done by means of the signal "USB active". Furthermore, core K of the smart card controller may query whether there is a clock signal at the ISO7816 interface. This information provides the possibility of taking decisions by means of the software, i.e. program commands to be run through in the smart card controller, on whether, for example, the I/O signal in accordance with the ISO7816 standard should be ignored, or operation should be allowed anyway, or whether the USB interface should be deactivated, and so forth.

In general, further interfaces can be added when using such a structure. Possible reset signals are formed per OR combination. Clock signals are initially monitored, and a corresponding status bit is made available so that it can be decided by means of the software whether such a clock signal is to be used or not used.

The following modes of operations are thus possible with an arrangement of the type described in accordance with the invention:

- the operation of a smart card controller may be performed at more than two interfaces
- the operation of a smart card controller may take place at a USB interface instead of an ISO7816 interface or an ISO14443 interface
- simultaneous operation of a smart card controller at the ISO7816 interface and at the USB interface is possible
- simultaneous operation of a smart card controller at the ISO14443 interface and at the USB interface is possible
- simultaneous operation of a smart card controller at the ISO7816 interface and at the ISO14443 interface is possible
- operation of the same smart card controller may be performed either at the ISO7816 interface or at the USB interface
- clock signal recognition or testing and making a corresponding status bit available for each clock signal to be monitored is realized
- clock signal recognition or testing and making an internal clock signal available is realized when an external clock does not satisfy the boundary conditions
- combination of all reset sources given by the different interfaces is realized by means of an OR function
- notification about the activity of the interfaces is made available in a status register, for example, by means of the signal "USB active" in the case of operation with a USB interface.

An advantage obtained by an improvement of the arrangement according to the invention is that it is made possible to operate a smart card controller at more than one interface, for example, at two interfaces in accordance with the ISO7816 and USB standards. Both interfaces can be used simultaneously. It is also possible to connect only one of the two interfaces. The decision whether an interface is to be used is made by the software. Consequently, it is possible to use a plurality of applications and open up several markets with only one product, i.e. a single microcontroller configuration. An arrangement according to the invention is particularly suitable for use in the "conventional" fields of application of smart card controllers in which the ISO7816 interface is used, and in PC applications in which USB interface devices are used. The versatility of the invention also allows applications in niche markets.

What is claimed is:

1. An arrangement comprising:
   a microprocessor which is connected to at least a USB interface and an ISO interface for exchanging data signals;
   a selection unit within the microprocessor configured to select between the USB and ISO interfaces; and
   a switching unit within the microprocessor configured to subsequently switch between the USB and ISO interfaces by initiating an internal reset of the microprocessor.

2. An arrangement as claimed in claim 1, wherein the microprocessor is formed for use in a chip card.

3. An arrangement as claimed in claim 1, wherein the selection unit selects the ISO interfaces if a clock signal applied to the microprocessor oscillates within a predetermined frequency range, and selects the USB interface if the clock signal applied to the microprocessor does not oscillate within the predetermined frequency range.

4. An arrangement as claimed in claim 1, wherein the the ISO interfaces is formed in accordance with ISO14443 and/or in accordance with ISO7816.

5. An arrangement as claimed in claim 2, further comprising an internal clock generation circuit configured to generate an internal clock signal in accordance with the USB interface if the clock signal applied to the microprocessor does not oscillate within the predetermined frequency range.

6. An arrangement as claimed in claim 1, wherein the switching unit is configured to switch from the USB interface to the ISO interface in response to detection of an external reset signal associated with the ISO interface.

7. An arrangement as claimed in claim 1, wherein the switching unit is configured switch from the ISO interface to the USB interface in response to detection that the USB interface is active.

8. An arrangement as claimed in claim 7, wherein detection that the USB interface is active is derived from D+ and D− data signals associated with USB interface.

* * * * *